United States Patent
Nara et al.

(10) Patent No.: US 6,747,965 B1
(45) Date of Patent: Jun. 8, 2004

(54) CDMA MOBILE COMMUNICATION SYSTEM

(75) Inventors: Hirokatsu Nara, Kawasaki (JP); Tohru Ida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 342 days.

(21) Appl. No.: 09/672,261

(22) Filed: Sep. 28, 2000

(30) Foreign Application Priority Data

Oct. 29, 1999 (JP) .......................................... 11-308593

(51) Int. Cl.$^7$ .......................... H04B 7/216; H04Q 7/20
(52) U.S. Cl. ...................... 370/335; 455/442; 455/560
(58) Field of Search .............................. 455/522, 525, 455/524, 560, 561, 436, 437, 439, 442, 450, 451; 370/331, 332, 333, 335, 342, 320

(56) References Cited

U.S. PATENT DOCUMENTS

| | | | | |
|---|---|---|---|---|
| 5,539,744 A | * | 7/1996 | Chu et al. ................... | 370/397 |
| 5,640,414 A | * | 6/1997 | Blakeney et al. ........... | 375/130 |
| 5,913,167 A | * | 6/1999 | Bonta et al. ................ | 455/436 |
| 6,101,175 A | * | 8/2000 | Schorman et al. .......... | 370/331 |
| 6,343,218 B1 | * | 1/2002 | Kaneda et al. .............. | 455/522 |
| 6,434,130 B1 | * | 8/2002 | Soininen et al. ............ | 370/331 |
| 6,496,496 B1 | * | 12/2002 | Ramakrishna et al. ...... | 370/342 |
| 6,510,319 B2 | * | 1/2003 | Baum et al. ................ | 455/442 |

FOREIGN PATENT DOCUMENTS

| | | |
|---|---|---|
| JP | 9-74378 | 3/1997 |
| JP | 10-23529 | 1/1998 |
| JP | 10-502778 | 3/1998 |

* cited by examiner

Primary Examiner—Charles Appiah
(74) Attorney, Agent, or Firm—Katten Muchin Zavis Rosenman

(57) ABSTRACT

ACDMAmobile communication system is disclosed in which a desired soft handoff operation is carried out by inhibiting signaling message transmission when a radio receiving condition at a receiving station is deteriorated. The system includes a plurality of mobile stations; a plurality of base stations, each including a transmitter for transmitting a common traffic channel to which each of the plurality of mobile stations can refer; and higher rank equipment for controlling and managing the plurality of base stations, including a table for managing the busy-idle state of each traffic channel in said plurality of base stations and a transmitter for transmitting information in said table to the plurality of mobile stations through the common traffic channel, wherein each of the plurality of mobile stations reports to said base station currently communicating at the time of soft handoff, information having, the received power of a pilot channel from the base station currently communicating, as well as the received power of a pilot channel from a target base station of soft handoff, and a short code of an idle traffic channel randomly selected using busy-idle information on traffic channels of said target base station obtained from the table information received through said common traffic channel of the target base station.

8 Claims, 9 Drawing Sheets

PRIOR ART

FIG. 6

| Walsh Code of Management Traffic Channel / Information | $W_8$ | $W_9$ | $W_{10}$ | ... | $W_C$ | ... | $W_{63}$ |
|---|---|---|---|---|---|---|---|
| Busy-Idle State | Busy | Idle | Idle | ... | Common | ... | Idle |
| Mobile Station | IMSI-$S_A$ | | | ... | — | ... | |

FIG. 8

| Management Information / Walsh Code of Traffic Channel | | $W_8$ | $W_9$ | $W_{10}$ | ...... | $W_{63}$ |
|---|---|---|---|---|---|---|
| Base Transceiver Station 2 | Busy-Idle State | Busy | Idle | Busy | ...... | Idle |
| | Mobile Station | IMSI-$S_1$ | | IMSI-$S_2$ | ...... | |
| Base Transceiver Station M | Busy-Idle State | | | | ...... | |
| | Mobile Station | | | | ...... | |
| Base Transceiver Station N | Busy-Idle State | | | | ...... | |
| | Mobile Station | | | | ...... | |

CDMA MOBILE COMMUNICATION SYSTEM

FIELD OF THE INVENTION

The present invention relates to a Code Division Multiple Access (CDMA) mobile communication system having a feature in transmitting a signaling message and more particularly a CDMA mobile communication system having a feature in transmitting a signaling message which is advantageous to the reception of an Extended Handoff Direction Message on executing a soft handoff operation.

BACKGROUND OF THE INVENTION

In a CDMA mobile communication system, an identical frequency zone is shared by a plurality of communication users. This may cause deteriorated communication quality because signals sent from other communicators may act as interference signals to the communication.

Particularly, when communications are simultaneously carried out using a mobile station located in the vicinity of a base station and another mobile station located remotely to a base station, signals from a near mobile station are received by the base station at high electric power level, while signals from a far mobile station are received at low power level. This produces substantially deteriorated communication quality to the remotely located mobile station, which is caused by the signal interference by the near mobile station. This problem is known as a "near-far problem".

In order to cope with above-mentioned problem, there has been studied to introduce a technique for controlling transmission power. The transmission power control method controls transmission power to maintain Eb/No at a constant level irrespective of the location of a mobile station. Here, Eb/No denotes a ratio of received energy (Eb) to received noise energy (No) respectively measured at a receiving station.

To realize the method, a power control bit has been introduced to insert in transmission frames to perform a "closed loop adjustment control", by which, at a receiving station, transmission power is adjusted based on the received power control bit.

Specifically, an average frame error rate (FER) is measured at a base station to compare with a target FER. When a difference exists between the target FER and a measured average FER, a target Eb/No is updated so that an average FER reaches nearer to the target FER.

At the base station, Eb/No is measured to compare with a target Eb/No. If a measured Eb/No is greater than the target Eb/No, a power control bit is inserted in information signals of forward (downlink) frames to direct the mobile station to lessen the transmission power therefrom. On the other hand, if a measured Eb/No is smaller than the target Eb/No, a power control bit is inserted to direct the mobile station to increase the transmission power.

At the mobile station, the power control bit is extracted from information signals in received frames. Transmission power is adjusted according to the power control bit.

Similarly, at the mobile station, an average FER (frame error rate) is measured to compare with a target FER. When a difference exists between the target FER and the measured average FER, a target Eb/No is updated so that a measured average FER reaches nearer to the target FER. Also, Eb/No is measured in transmission signals from the base station to compare with a target Eb/No. If a measured Eb/No is greater than the target Eb/No, a power control bit is inserted in information signals of reverse (uplink) frames to direct the base station to lessen the transmission power output therefrom. On the other hand, if a measured Eb/No is smaller than the target Eb/No, a power control bit is inserted to direct the base station to increase the transmission power.

At the base station, the power control bit is extracted from information signals in received frames. Transmission power is adjusted according to the power control bit.

Accordingly, a closed loop adjustment control is carried out to control transmission power in cooperation with the mobile station and the base station.

On the other hand, call control sequences (call originating, terminating, handoff, and so forth) in a CDMA system are carried out independently to the transmission power control mentioned above. In the conventional technology, signaling messages are transmitted in call control sequences without any consideration on the condition of received radio wave.

Therefore, there are cases that signaling messages are transmitted even when a radio condition is deteriorated at the receiving side. In such cases, the transmitted signaling messages may not be received because of an occurrence of frame error.

To avoid risks of reception failure in conventional CDMA mobile communication system, such a measure has been introduced as a retransmission of a signaling message when an acknowledgement message cannot be received within a predetermined period after the relevant signaling message is transmitted.

However, the above-mentioned measure may cause another problem that the retransmitted signaling message newly becomes an interruption source against communications of other mobile stations.

SUMMARY OF THE INVENTION

It is accordingly an object of the present invention to provide a mobile communication system using CDMA (Code Division Multiple Access) scheme having a feature in signaling message transmission control which ensures a predetermined processing by avoiding the transmission of a signaling message when the radio receiving condition at the receiving side is deteriorated.

It is another object of the present invention to provide a mobile communication system which controls the transmission of a signaling message at the start of soft handoff procedure by which communication is carried out particularly among a plurality of base stations.

In order to achieve the aforementioned object, the transmission timing of a signaling message in the present invention is controlled considering the radio receiving condition at the reception side.

Preferably, in the present invention, a mobile communication system based on CDMA scheme comprises a plurality of mobile stations, a plurality of base stations, and higher rank equipment (i.e. a mobile switching center and a base station controller) for controlling and managing the plurality of base stations. In the base stations, a means is provided for transmitting a common traffic channel to which each plurality of mobile stations can refer.

In each of the higher rank equipment mentioned above, a table is provided for managing the busy-idle state of each traffic channel in each plurality of base stations. A means is also provided for transmitting information in the above-mentioned table to the plurality of mobile stations through the common traffic channel of the base station.

It is a feature of the present invention to provide the mobile stations with a means for reporting, during soft handoff process to communicate simultaneously with the plurality of base stations, to the base station currently communicating the received power of a pilot channel from the base station currently in communication, as well as the received power of a pilot channel from a target base station of soft handoff, and a short code of an idle traffic channel randomly selected with a random number or the like using busy-idle information on traffic channels of the target base station of soft handoff based on the table information received on the common traffic channel of the target base station.

Further, preferably, the above-mentioned common traffic channel is transmitted using a common short code and a common long code.

Still further, the above-mentioned higher rank equipment provides a table for managing the busy-idle state on traffic channels of base stations surrounding a base station currently communicating with a mobile station, the content of the table being transmitted from the base station to the mobile station through a traffic channel each time the table is updated.

At the time of soft handoff when simultaneously communicating with a plurality of base stations, the mobile station obtains report information on the received power of a pilot channel from the base station currently communicating, as well as the received power of a pilot channel from a target base station of soft handoff, and a short code of an idle traffic channel randomly selected using a random number or the like from idle traffic channels of said target base station extracted from traffic channel busy-idle information related to said surrounding base stations received from said higher rank equipment.

Still further, preferably, in the above-mentioned procedure the higher rank equipment provides a means for receiving the report information from the mobile station through the base station to examine using the table whether the short code specified in said received report information is idle. When the short code is determined to be idle, the higher rank equipment directs the target base station of soft handoff to acquire a reverse traffic channel of the mobile station to start to transmit a traffic data of the mobile station through the traffic channel specified by the short code. A means is also provided in the higher rank equipment that, with setting busy, state on the short code in the table, and transmitting the table information to the mobile station through the traffic channel of the base station currently communicating and through the common traffic channel of the target base station of soft handoff.

Still further, preferably in a mobile communication system adopting CDMA scheme which includes a plurality of mobile stations, a plurality of base stations and higher rank equipment for controlling and managing the base stations, a power control bit is transmitted and received between the mobile station and the base station, to control to inhibit the transmission of signaling messages to the mate stations when the power control bit indicates deteriorated receiving condition.

Also, preferably the aforementioned signaling message is an Extended Handoff Direction Message transmitted through a forward traffic channel from a target base station of soft handoff to a mobile station at the start of soft handoff operation.

Still further, preferably in a CDMA mobile communication system which includes a mobile station, a first base station and a second base station each having mutually neighboring coverage areas, and higher rank equipment for managing the first base station and the second base station, the higher rank equipment in the system provides a table for managing the busy-idle state of codes allocated to a forward traffic channel of the second base station, and at least either the first or the second base station provides a code information transmission means for transmitting to the mobile station the busy-idle information obtained from the higher rank equipment. The mobile station in the system provides; an information reception means for receiving the busy-idle code information; a selection means to select an idle code by use of information content received by the information reception means; a report means to report a signal to the higher rank equipment to specify the selected code through the base station at the time of handoff from the first base station to the second base station; and a reception means for performing a receiving operation on a traffic channel from the second base station to the mobile station itself by use of the selected code. In addition, the higher rank equipment provides a control means for controlling the second base station to start to transmit a traffic channel to the mobile station by use of the specified code when the report is received.

Other features of the present invention will become more apparent by the description of the embodiments referring to the accompanied charts and drawings.

BRIEF DESCRIPTION OF THE DRAWINGS

FIG. 6 shows an example of a traffic channel management table 100 for managing the busy-idle state of the traffic channels.

FIG. 8 shows an example of a traffic channel management table for surrounding base stations 101 related to base stations 2, M and N which surrounds a base station 1 currently communicating with a mobile station.

PREFERRED EMBODIMENTS OF THE INVENTION

An embodiment of the present invention is described hereinafter referring to the accompanied drawings wherein like numerals and symbols refer to like parts.

For better understanding of the present invention, an issue of the signaling message transmission at the time of initiating a handoff operation is described first.

Figure 1:
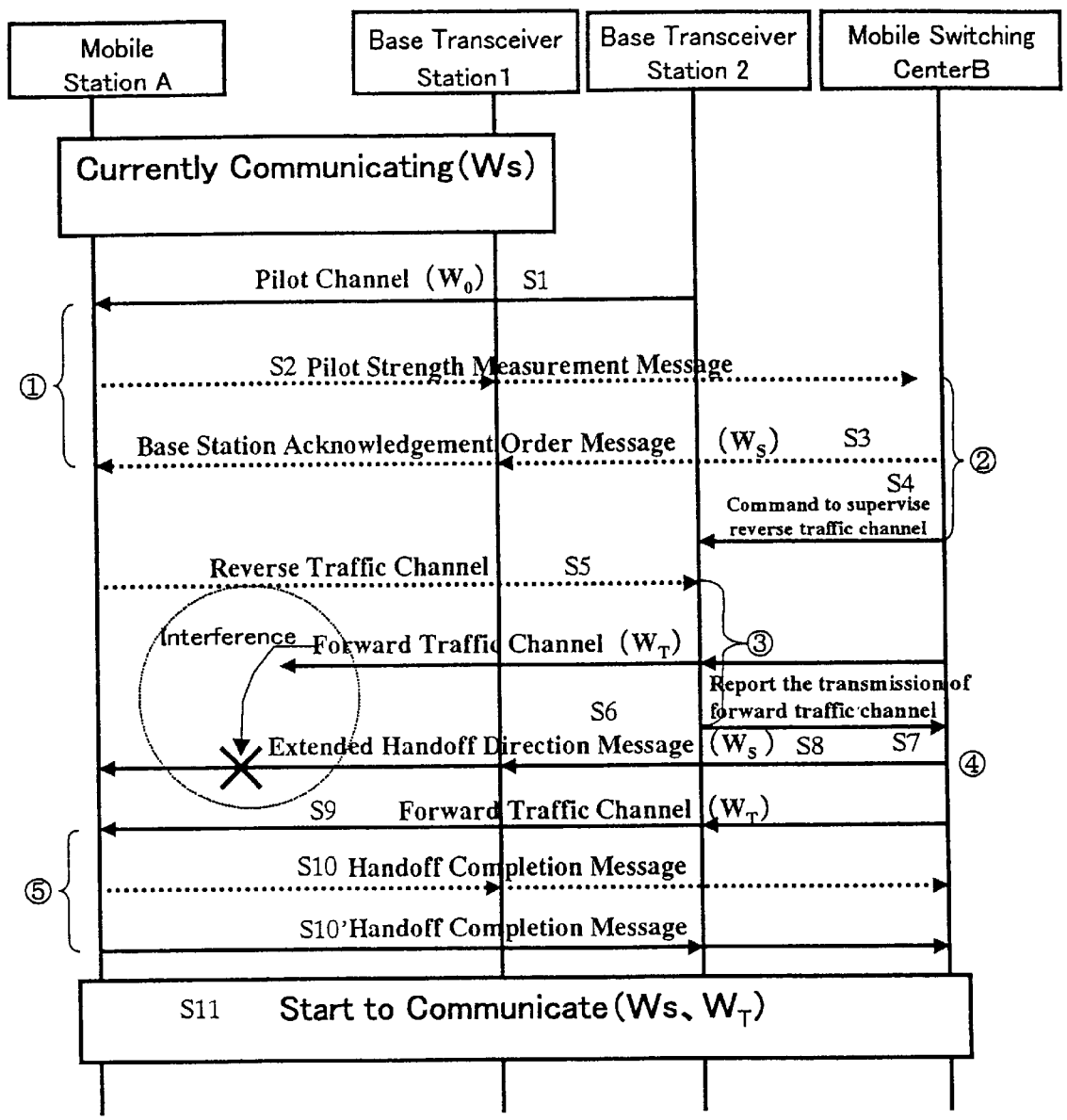
FIG. 1 shows a conventional soft handoff sequence in a CDMA mobile communication system.

In FIG. 1, there is illustrated a conventional soft handoff sequence in a mobile communication system adopting the Code Division Multiple Access (CDMA) scheme. In mobile communication system, 'soft handoff' means a state of communication between a mobile station and a plurality of base stations of which radio zones are situated neighboring a zone of the mobile station when the mobile station is moving near to a boundary of the zones of different base stations.

In FIG. 1, when a mobile station (A) is communicating through a base station 1 moving to a boundary of a radio zone of base station 2, mobile station (A) detects received power of a pilot channel from base station 1 which is currently communicating with mobile station (A). At the same time, mobile station (A) detects received power of a pilot channel from base station 2 which belongs to a zone into which mobile station (A) is moving, i.e. a target zone of the handoff (step S1).

When the received power of the pilot channel from base station 2 exceeds a threshold value, mobile station (A) reports this information to base station 1 and to higher rank equipment i.e. a mobile switching center and base station control equipment (hereinafter the higher rank equipment is simply referred to as mobile switching center (B).) (step S2).

On receipt of the report information from mobile station (A) through base station 1, mobile switching center (B) transmits a reception confirmation (acknowledgement) message (step S3). (Refer to FIG. 1 ①.)

Also, mobile switching center (B) issues a command to direct base station 2, a target base station of the handoff, to acquire a reverse traffic channel of mobile station (A) and to start the transmission of forward (downlink) traffic data to mobile station (A) using a specified short code (e.g. a Walsh code) (step S4). (Refer to FIG.1 ②.)

On receipt of the above-mentioned command, the handoff target base station 2 starts to supervise reverse traffic channels (step S5), and after the acquisition is completed, base station 2 starts transmission using a forward traffic channel specified by the short code with the initial transmission power having a fixed value (step S6) then to report this to mobile switching center (B) (step S7). (Refer to FIG.1 ③.)

On receipt the above-mentioned report, mobile switching center (B) transmits an Extended Handoff Direction Message to mobile station (A) with a short code for communicating with the target base station 2 through a traffic channel of base station 1 being used for current communication (step S8). (Refer to FIG. 1 ④.)

After mobile station (A) receives the Extended Handoff Direction Message, it becomes possible for mobile station (A) to receive on a forward traffic channel from the target base station 2 using the specified short code (step S9).

Mobile station (A) then transmits a Handoff Completion Message to mobile switching center (B) through the respective base stations 1 and 2 (step S10, S10'). (Refer to FIG.1 ⑤.)

Thus the soft handoff procedure is completed. Mobile station (A) now starts to communicate with both base stations 1 and 2 (step S11).

There is a problem, however, in conventional technology as described below.

Soft handoff is initialed when mobile station (A) moves in radio area of base station 1 currently in communication and reaches a boundary of radio area of base station 2 i.e. the target base station of the handoff.

Then, base station 2 starts transmission with the initial transmission power having a fixed value on a forward traffic channel to mobile station (A) which is executing handoff operation without any consideration on the receiving condition at mobile station (A) (step S6).

Specifically, when base station 2 receives from mobile switching center (B) a command to acquire a reverse traffic channel of mobile station (A) (step S4), base station 2 starts transmission to mobile station (A) with the initial transmission power having a fixed value (step S6). This brings excessive power on the traffic channel against mobile station (A).

The reason is that at this moment mobile station (A) has not recognized a Walsh code $W_T$ which is a short code of a forward traffic channel to communicate with base station 2. Therefore this produces interference not only against other mobile stations but also mobile station (A) itself.

In addition, the fixed initial power transmitted from base station 2 increases useless interference because no appropriate transmission power control is effective at the time of closed loop. This increases deteriorated error rate on forward (downlink) communication, which may cause a fail to receive the Extended Handoff Direction Message with a short code to communicate with the handoff target base station 2 (step S8). (Refer to a mark X in FIG. 1.) The handoff fails to complete in such a case.

The object of the present invention is therefore to solve above-mentioned disadvantage which exists in the conventional technique.

A first embodiment of the present invention solves the above problem by controlling a transmission timing of signaling messages. For this purpose, a power control bit is introduced for controlling transmission power in a closed loop adjustment control.

In the first embodiment, a base station receives signals on a reverse traffic channel to estimate the signal intensity received from a specified mobile station allocated to the channel at the interval of 1.25 ms. Using this estimated value, the value of power control bit (i.e. '0' or '1') is determined.

The value '0' indicates to direct the mobile station to increase an average transmission power level, while the value '1' indicates to direct the mobile station to decrease an average transmission power level. The power control bit composed of one bit ('0' or '1') is continuously transmitted to the mobile station through a power subchannel in a forward traffic channel at the interval of 1.25 ms.

Similarly, on mobile station side, an mobile station receives signals on a forward traffic channel to estimate the signal intensity received from the base station to which the channel is allocated at the interval of 1.25 ms. Using this estimated value, the value of power control bit ('0' or '1') is determined.

The value '0' directs the base station to increase an average transmission power level, while the value '1' directs the base station to decrease an average transmission power level. The power control bit composed of one bit ('0' or '1') is continuously transmitted to the base station through a power subchannel in a reverse traffic channel at the interval of 1.25 ms.

According to the first embodiment of the present invention, in a CDMA mobile communication system having a function of transmission power control using a closed loop adjustment control, the transmission power of signaling messages by an mobile station is determined using the above-mentioned power control bit transmitted from a base station. Also the transmission power of signaling message by a base station is determined using the power control bit transmitted from an mobile station.

Namely, when a power control bit indicates a command to "decrease transmission power", signaling messages are controlled to transmit. Also when a power control bit indicates a command to "increase transmission power", signaling messages are controlled to inhibit transmission.

More specifically, in the example shown in FIG. 1, when a power control bit transmitted from mobile station (A) to base station 1 directs base station 1 to increase transmission power therefrom, it is estimated that the signal receiving state is so deteriorated that mobile station (A) is not in a proper condition to receive an Extended Handoff Direction Message as a signaling message from base station 1. In this case, therefore, base station 1 is controlled not to transmit an Extended Handoff Direction Message.

Here, it may otherwise be possible to suspend the transmission of an Extended Handoff Direction Message (signaling) in the case a command by power control bit continuously indicates to increase transmission power for a predetermined time period (e.g. less than 400 ms; also applicable in the cases below).

Referring to the number of consecutive commands indicated to increase transmission power, when the number exceeds a predetermined value, the transmission of the Extended Handoff Direction Message is suspended because a deteriorated receiving condition is estimated. The transmission of the Extended Handoff Direction Message is restarted when the power control bit indicating to decrease the transmission power is received, or alternatively, when the successive power control bits indicating to decrease the transmission power are received for a predetermined period.

Furthermore, alternatively, it may be possible to determine the transmission timing of the Extended Handoff Direction Message by accumulating the successive values of the power control bit for a predetermined period, thus estimating the signaling receiving condition by the accumulated value. As a matter of course, any other possible ways of arithmetic operation may be applied.

Figure 2:
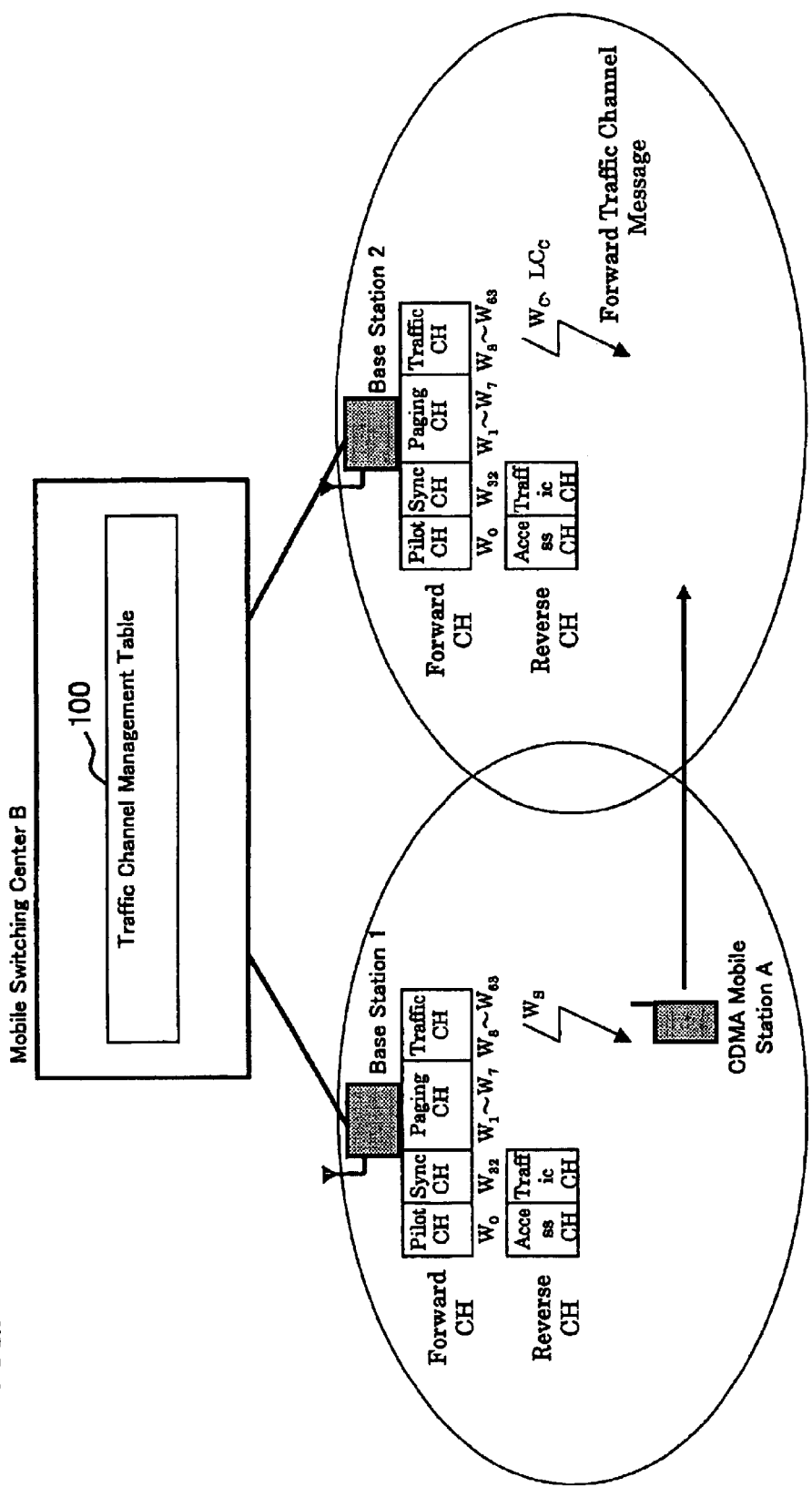
FIG. 2 shows a second embodiment of the present invention.

In FIG. 2, there is shown a conceptual diagram illustrating a second embodiment of the present invention. A CDMA mobile communication system shown in FIG. 2 includes; a plurality of CDMA mobile stations (A), referring to as mobile station (A) (in FIG. 2, a single mobile station (A) is shown); a plurality of base stations 1 and 2; and a mobile switching center (B), referring to as mobile switching center (B), for managing and controlling the base stations 1 and 2,.

Figure 3:
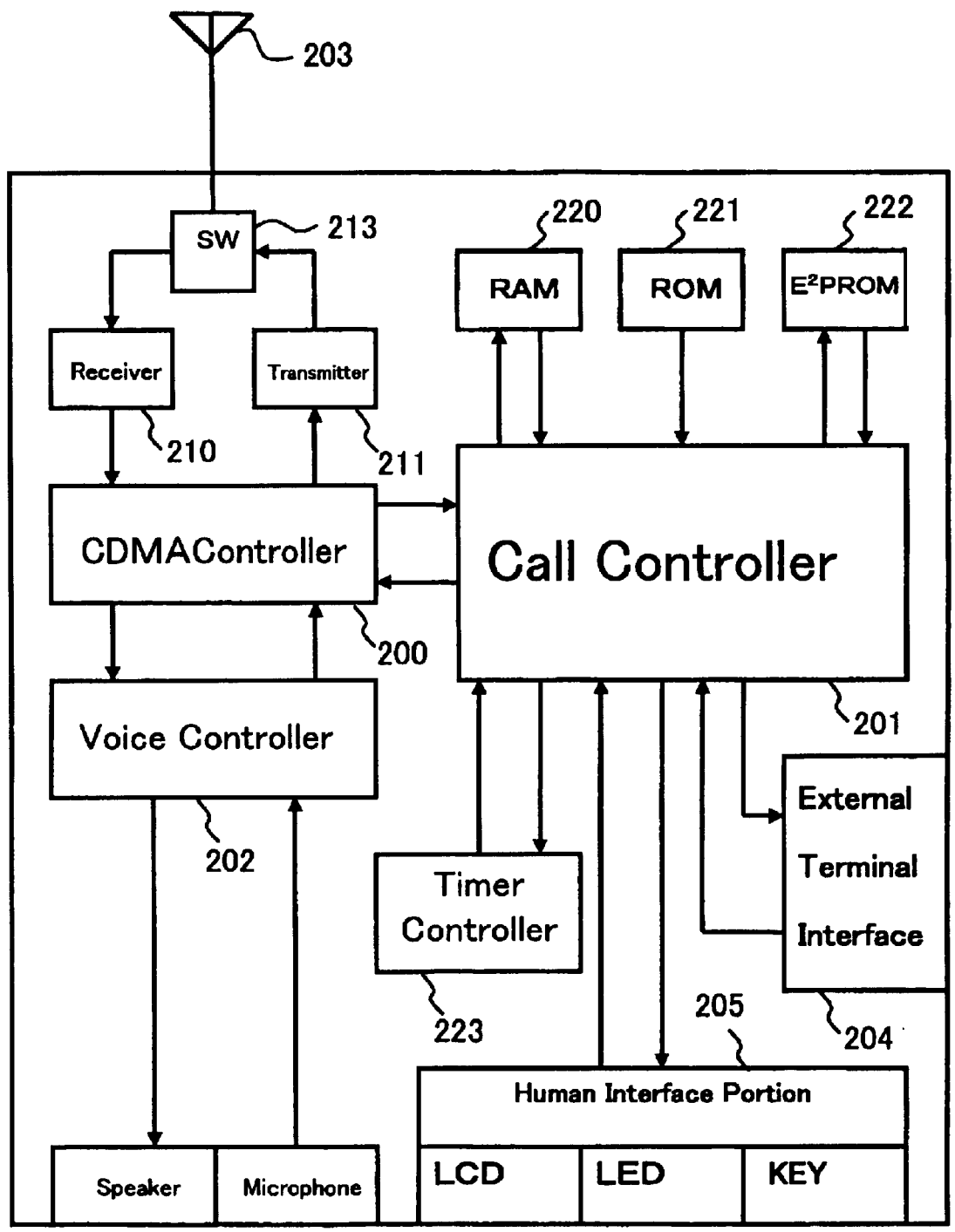
FIG. 3 shows a configuration example of a mobile station (A) in the second embodiment shown in FIG. 2.

In FIG. 3, a detailed configuration of mobile station (A) shown in FIG. 2 is illustrated mobile station (A) includes the following controllers; a CDMA controller 200, a call controller 201 and a voice controller 202.

CDMA controller 200 controls reception and transmission and is connected to a receiver 210 and a transmitter 211. Receiver 210 and transmitter 211 are respectively connected to an antenna 203 via a switch 213.

Call controller 201 performs call control and overall control of mobile station. For this purpose, a RAM 220, a ROM 221, an E²PROM 222 and a timer controller 223 are connected as peripheral equipment. Also, call controller 201 are connected to CDMA controller 200, external terminal interface 204, as well as a human interface portion 205 which provides an LCD, an LED and a key switch.

Figure 4:
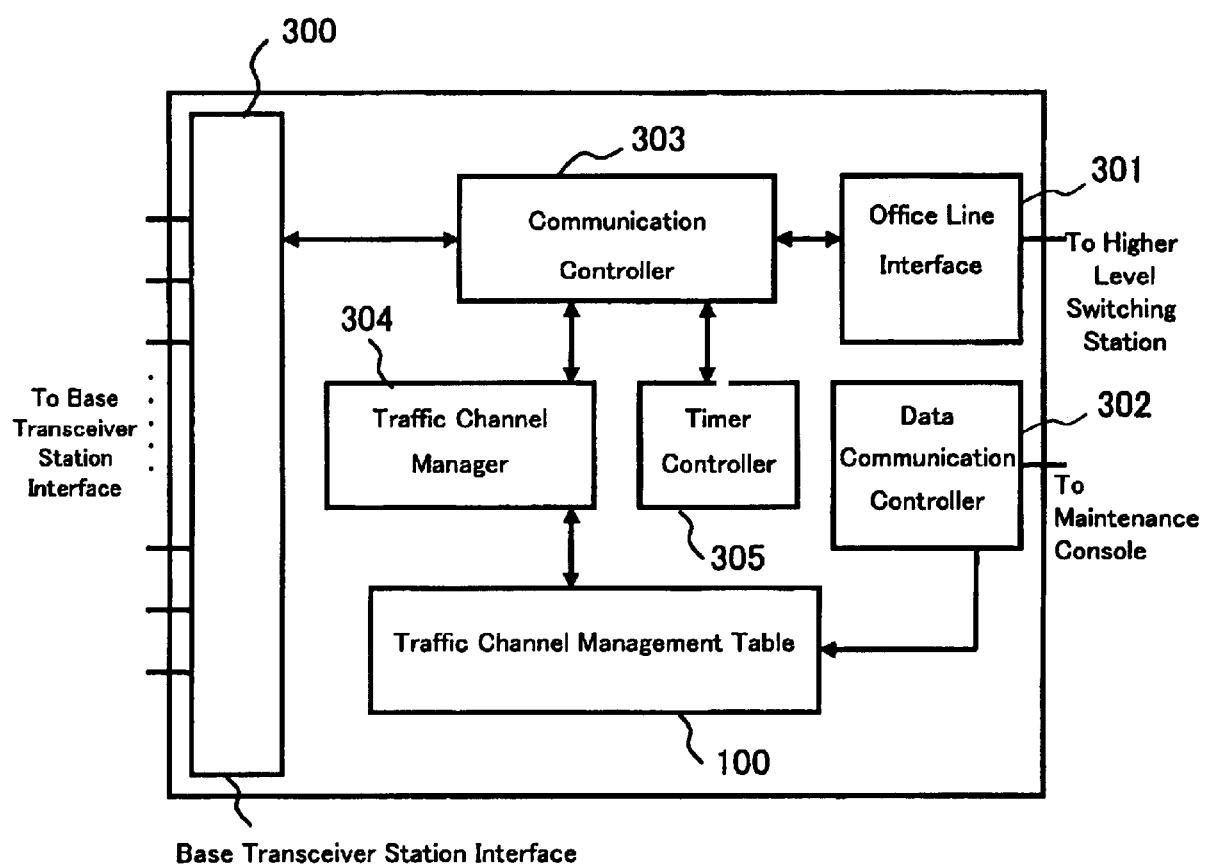
FIG. 4 shows a configuration example of a mobile switching center (B) in the second embodiment shown in FIG. 2.

On the other hand, CDMA controller 200 is connected to voice controller 202 through which voice input from a microphone and voice output to a speaker are controlled. In a mobile station having such configuration as described above, a mobile station number (denoted as, for example, IMSI#$S_A$), a Walsh Code (hereafter referred to as Wc) and a common long code (LCc) representing a common traffic channel are stored in E²PROM 222. In FIG. 4, there is shown a configuration example of a block diagram of mobile switching center (B). Mobile switching center (B) includes a base station interface 300 for transmitting and receiving signals between mobile switching center (B) and respective base stations 1 and 2; an office line interface 301 for transmitting and receiving signals between mobile switching center (B) and a higher level switching station (not shown); and data communication controller 302 for transmitting and receiving data signals between mobile switching center (B) and a maintenance console (not shown).

Mobile switching center (B) also includes a communication controller 303 for controlling to input signals received from either base station interface 300 or an office line interface 301, or to output signals to be transmitted thereto. Communication controller 303 is connected to a traffic channel manager 304 for controlling a traffic channel management table 100 is updated and read out.

Also, communication controller 303 is connected to a timer controller 305 for controlling the processing time in communication controller 303.

Based on the configurations of mobile station (A) and mobile switching center (B) shown as the examples in FIG. 3 and FIG. 4, an operation of soft handoff in the system shown in FIG. 2 is explained hereafter.

Figure 5:
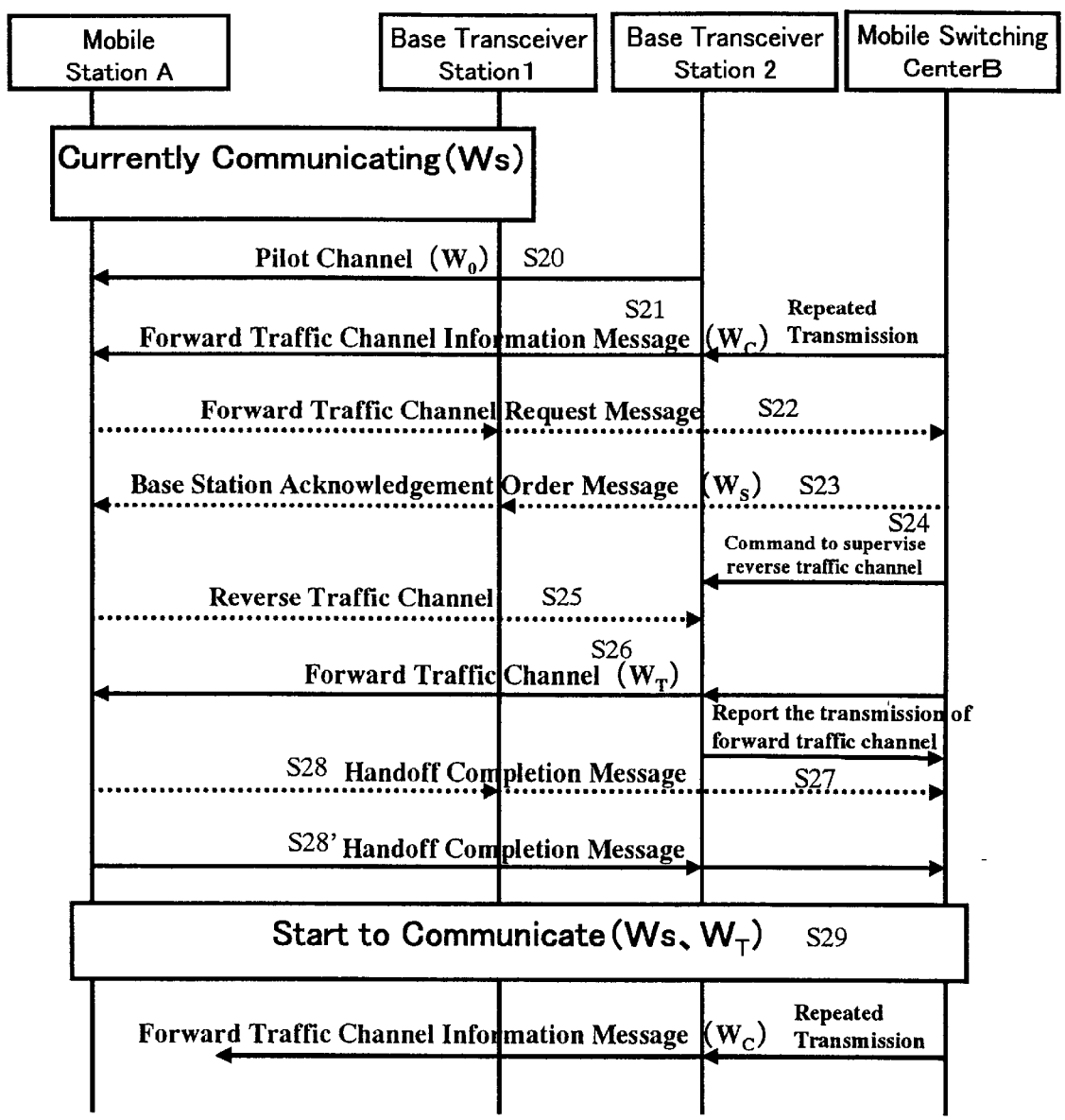
FIG. 5 shows a flow diagram for illustrating a handoff processing operation in the system shown in FIG. 2.

In FIG. 5, a flowchart is shown to illustrate an operation of handoff processing in the system shown in FIG. 2. The operation in the system shown in FIG. 2 is explained hereafter referring to FIG. 5.

In the system shown in FIG. 2, a forward channel from either base station 1 or 2 to mobile station (A) includes a pilot channel, a synchronization channel, a paging channel and a traffic channel, while a reverse channel from mobile station (A) to either base station 1 or 2 includes an access channel and a traffic channel.

An object of traffic channel management table 100 in mobile switching center (B) shown in FIG. 4 is to manage the busy-idle state of respective traffic channels in base stations 1 and 2, as explained later.

Communication controller 303 in mobile switching center (B) transmits to mobile station (A) information stored in traffic channel management table 100 read out by traffic channel manager 304 through base stations 1 and 2 using a common traffic channel Wc.

In FIG. 6, there is shown an example of traffic channel management table 100 for managing the busy-idle state of traffic channels. In this table, the busy-idle state and management information are recorded for respective Walsh Codes $W_8$ to $W_{63}$. The traffic channel Wc is commonly used for all mobile stations.

In the example shown in FIG. 6, it is indicated that the traffic channel $W_8$ is currently used for a mobile station having the mobile station code IMSI-$S_A$.

When a power switch in mobile station (A) is turned ON, call controller 201 in mobile station (A) informs CDMA controller 200 about a common traffic channel Wc and a common long code LCc. In FIG. 2, base stations 1 and 2 conduct spread spectrum transmission of a traffic management table corresponding to the base station received from mobile switching center (B) continuously through a common traffic channel (or alternatively, periodically or at the time of updating).

Namely, mobile switching center (B) shown in FIG. 2 manages traffic management table 100 shown in FIG. 6. Each time traffic management table 100 is updated, the table content is stored in Information Message in a forward traffic channel to transmit to base stations 1 and 2 using common traffic channel Wc.

As shown in FIG. 2, mobile station (A) is communicating with base station 1 using a traffic channel $W_s$, and is moving in the radio area of base station 1. When mobile station (A) reaches near the boundary of the radio area of base station 2, CDMA controller 200 in mobile station (A) detects a pilot channel $W_0$ of base station 2 (step S20 in FIG. 5)

Then, CDMA controller 200 of mobile station (A) decodes the common traffic channel by Wc and LCc, to receive Forward Traffic Channel Information Message (step S21).

Regarding the reception of Forward Traffic Channel Information Message described above, it is possible to receive periodically corresponding to the repeated transmission from a base station, instead of successively to the detection of the pilot channel in the step 20.

In the step S21 explained above, the Forward Traffic Channel Information Message received by mobile station (A) is reported to call controller 201 together with received power value on pilot channel $W_0$ of base station 2.

Then, call controller 201 in mobile station (A) extracts a traffic channel management table (refer to FIG. 6) which is included in Forward Traffic Channel Information Message continuously transmitted from mobile switching center (B) through a common traffic channel (step S21).

Call controller 201 in mobile station (A) generates a handoff initiation request to prepare in a Forward Traffic Channel Request Message. The above message includes the received power value of the pilot channel of base station 2 and a Walsh Code (hereinafter referred to as $W_T$) of an idle traffic channel randomly selected, using a random number or the like, out of idle traffic channels written in the traffic channel management table in order to prevent a collision of use among other mobile stations.

Then this request is transmitted from CDMA controller 200 to base station 1 using a reverse channel (step S22). Call controller 201, after requesting a reception request of a forward traffic channel of $W_T$ to CDMA controller 200, requests to a timer controller 223 to initiate a timer TA connected to call controller 201 to wait for a reception completion information of the forward traffic channel of $W_T$ from CDMA controller 200. If a timeout is detected on timer TA, the process is started afresh from step S21.

Communication controller 303 in mobile switching center (B), on receipt of a Forward Traffic Channel Request Message via base station 1, reports $W_T$ specified therein to traffic channel manager 304.

Then traffic channel manager 304 checks whether the $W_T$ has not been engaged by other mobile stations using traffic channel management table 100. If it is confirmed the channel has not been engaged, traffic channel manager 304 sets 'busy' into a busy-idle record and also sets 'IMSI#$S_A$' into a record of the mobile station in use provided in traffic channel management table 100, then reports the content of the traffic channel management table 100 to communication controller 303.

If, on the other hand, the $W_T$ has already been engaged by other mobile station, traffic channel manager 304 reports the current content of traffic channel management table 100 to communication controller 303.

Then, communication controller 303 directs the handoff target base station 2 to acquire a reverse traffic channel of mobile station (A) and to start data transmission of forward traffic to mobile station (A) using $W_T$ (step S23). Also, communication controller 303 requests timer controller 305 to start timer TB to wait for the transmission and reception completion information of forward and upward traffic to be received from base station 2.

When a timeout is detected on timer TB, the handoff processing is suspended to wait for the process of above-mentioned S21 performed by mobile station (A).

On receipt of the direction described above, base station 2 starts to supervise reverse traffic channels of mobile station (A) (step S25) indicated by mobile switching center (B) (step S24).

When a reverse traffic channel of mobile station (A) is acquired, base station 2 starts transmission of traffic data for mobile station (A) onto the traffic channel $W_T$ (step S26), and reports to mobile switching center (B) transmission and reception completion information of forward and reverse traffic (step S27).

When communication controller 303 in mobile switching center (B) receives transmission and reception completion information of forward and reverse traffic, communication controller 303 requests timer controller 305 to suspend the timer TB, and requests timer controller 305 to start timer TC to wait for a Handoff Completion Message to be received from mobile station (A) via base stations 1 and 2 (step S28 and S28').

When a timeout is detected on timer TC, communication controller 303 directs base station 2 to stop the current transmission of traffic channel $W_T$.

CDMA controller 200 in mobile station (A), on receipt of forward traffic channel $W_T$ from the handoff target base station 2, stops timer TA, then transmits Handoff Completion Message to mobile switching center (B) (step S28 and S28').

Communication controller 303 in mobile switching center (B), on receipt of Handoff Completion Message through base stations 1 and 2, stops timer TC. Thus the handoff operation is completed, and mobile station (A) enters into a communication state with both base stations 1 and 2 (step S29).

Figure 7:
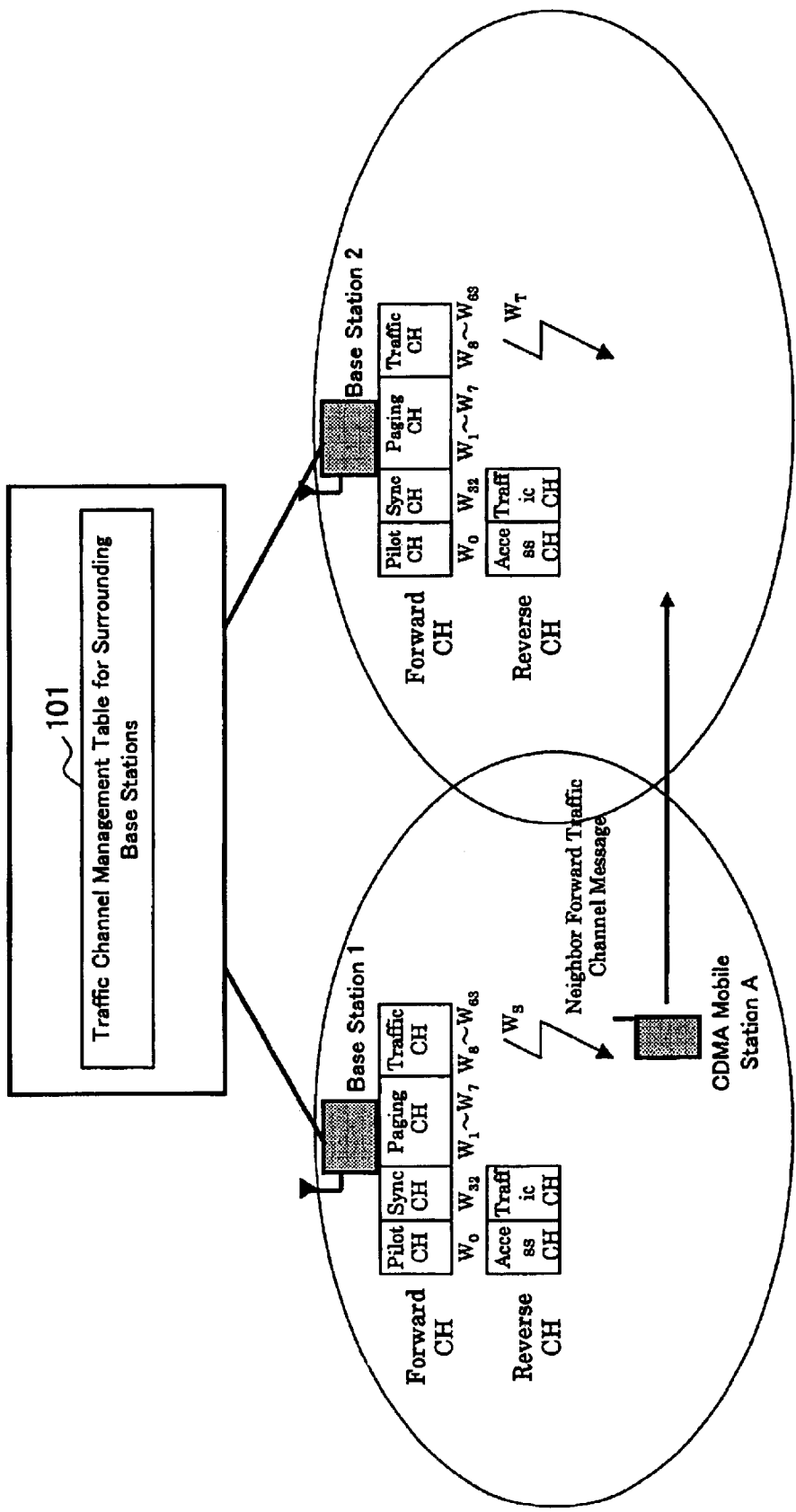
FIG. 7 shows a schematic diagram of a third embodiment of the present invention.

In FIG. 7, a conceptual diagram of a third embodiment of the present invention is shown. Compared to the embodiment shown in FIG. 2, in the embodiment shown in FIG. 7, mobile switching center (B) manages a traffic channel management table (for surrounding base stations) 101 in which information relates to base stations 2, M and N situated in the surrounding areas of base station 1 currently communicating with mobile station (A). The above table is shown in FIG. 8.

In FIG. 8, it is shown that base station 2 is currently using Walsh Code W8 for communicating with a mobile station IMSI-S1, and Walsh Code W10 for communicating with another mobile station IMSI-S2.

Figure 9:
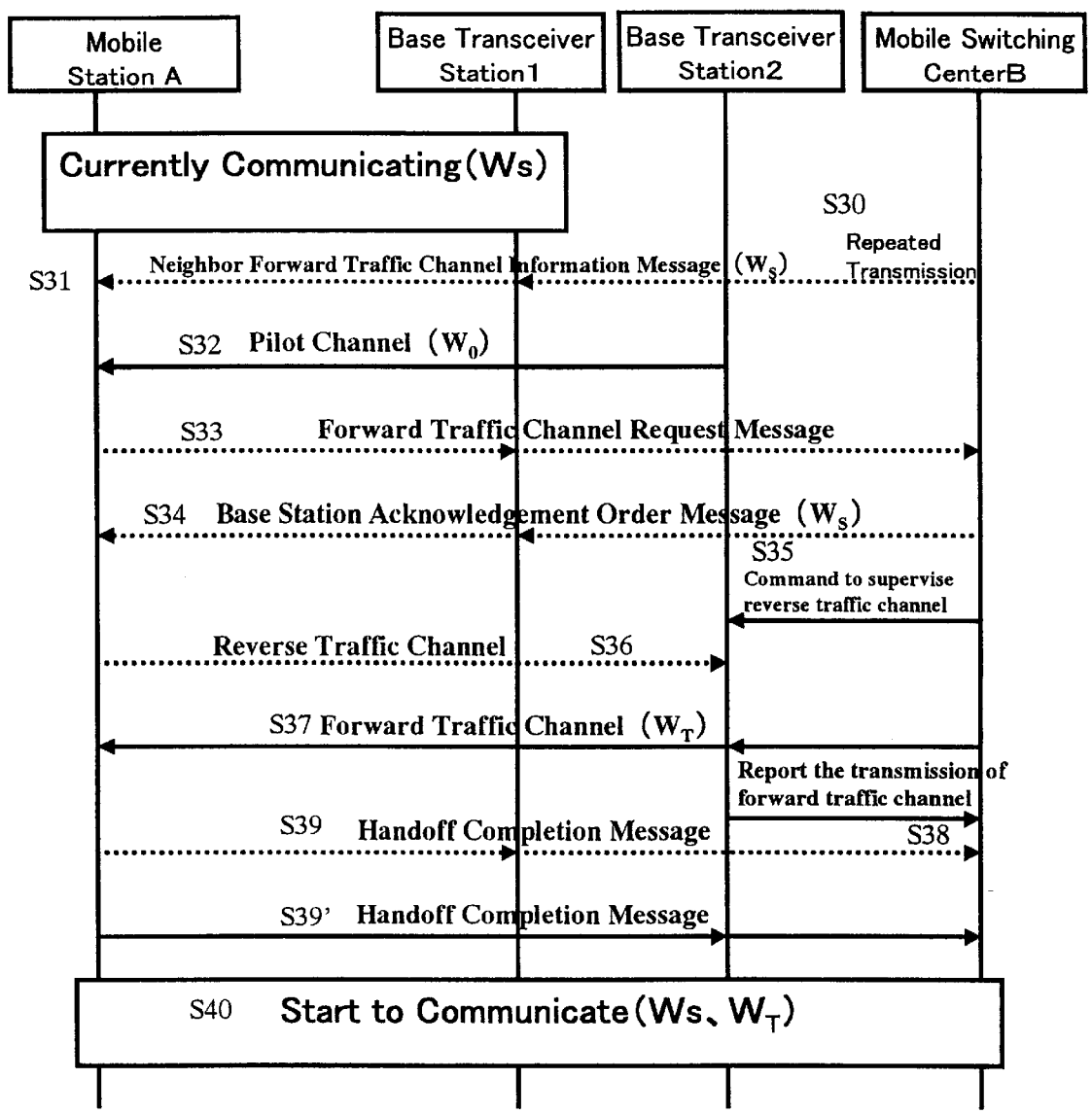
FIG. 9 shows a sequence flow diagram of the third embodiment of the present invention, which corresponds to FIG. 5

In FIG. 9, a sequence flowchart of the third embodiment is shown, which corresponds to FIG. 5 of the previously explained embodiments. Referring to the flowchart in FIG. 9, each time when traffic channel management table (for surrounding base stations) 101 is updated, the content of this table is stored in Neighbor Forward Traffic Channel Information Message to transmit repeatedly from a base station currently communicating with mobile station (A) (step S30). Then, mobile station (A), on receipt of Neighbor Forward Traffic Channel Information Message (in this case, a 'neighbor' corresponds to base station 2), extracts traffic channel management table (for surrounding base stations) 101 to store into RAM 220 (step S31).

As shown in FIG. 7, when mobile station (A) which is communicating with base station 1 using Ws is moving toward near the boundary between a radio area of base station 1 and a radio area of base station 2, CDMA controller 200 of mobile station (A) detects a pilot channel $W_0$ of base station 2 exceeding a threshold level. Upon this detection, CDMA controller 200 reports to call controller 201 received power value of the pilot channel $W_0$ of base station 2 (step S32).

Call controller 201 in mobile station (A) then extracts a traffic channel busy information corresponding to the handoff target base station 2 from traffic channel management table (for surrounding base stations) 101 which has previously been stored in RAM 220.

Based on this traffic channel busy-idle information, a handoff initiation request is transmitted from CDMA controller 200 to base station 1 through a reverse traffic channel. This request includes the following information stored in a Forward Traffic Channel Request Message; An Walsh Code $W_T$ of an idle traffic channel randomly selected among Walsh Codes of idle traffic channels, using a random number or the like, to avoid a collision against other mobile stations; received power value of a pilot channel of base station 2; and an ID of base station 2 (step S33).

Thereafter, call controller 201 in mobile station (A) reports to CDMA controller 200 a reception request of forward traffic channel $W_T$, and starts timer TA to wait for a Base Station Acknowledgement Order Message on a forward traffic channel $W_T$ from CDMA controller 200. When a timeout is detected on timer TA, the processing is started afresh from the above step S30.

At the same time, communication controller 303 in mobile switching center (B), on receipt of a Forward Traffic Channel Request Message through base station 1, reports $W_T$ and the ID of base station 2 which are specified in the Forward Traffic Channel Request Message to traffic channel manager 304 (step S34).

Traffic channel manager 304 checks whether any other mobile station has already been using $W_T$ of base station 2, using traffic channel management table (for surrounding base stations) 101. If it is confirmed that no station is using $W_T$, the busy-idle record related to $W_T$ is set to 'busy' and also a record of mobile station in use is set as 'IMSI#$S_A$' in traffic channel management table (for surrounding base stations) 101. The above updated traffic channel management table 101 is reported to communication controller 303.

On the other hand, if other station is already using $W_T$, the current traffic channel management table 101 is reported to communication controller 303. Then, communication controller 303 directs the handoff target base station 2 to acquire a reverse traffic channel of mobile station (A) and to start forward traffic data transmission to mobile station (A) using $W_T$ (step S35).

At the same time, communication controller 303 initiates a timer TB to wait for a forward and reverse traffic transmission and reception completion information to be received from base station 2. When a timeout is detected on timer TB, communication controller 303 suspends the handoff process and stands by to expect the above-mentioned process of step S31 by mobile station (A).

Base station 2, on receipt of the command described above, starts to supervise reverse traffic channels of mobile station (A). When a channel is acquired, base station 2 transmits to mobile switching center (B) a forward and reverse traffic transmission and reception completion information (step S37).

On receipt of the above command, communication controller 303 in mobile switching center (B) stops timer TB and starts timer TC to wait for a Handoff Completion Message to be received from mobile station (A) through base stations 1 and 2 (step S39 and S39'). If a timeout is detected on timer TC, communication controller 303 directs base station 2 to suspend current transmission on the traffic channel $W_T$ (step S38).

CDMA controller 200 in mobile station (A), suspend timer TA on receipt of forward traffic channel $W_T$ from the handoff target base station 2, and transmit a Handoff Completion Message to mobile switching center (B) through base stations 1 and 2 (step S39 and S39').

Communication controller 303 in mobile switching center (B) suspends timer TC on receipt of Handoff Completion Message through base stations 1 and 2. Thus the handoff operation is completed and mobile station (A) starts to communicate with base stations 1 and 2 (step S40).

Compared to the method shown in FIG. 1, in the second and third embodiments explained above, the reception of call control message (step S6) on a forward traffic channel is not required in the handoff operation of mobile station (A).

To summarize the present invention, using the configuration in the first embodiment, a power control bit is introduced to obtain the receiving condition at the receiving station so that the message transmission timing is controlled to inhibit signaling message transmission when the receiving condition is deteriorated. This solves a problem of generating additional receiving noises which may be caused by the message retransmission.

Furthermore, in the second and third embodiments, the problem shown in FIG. 1 which arises on the initiation of soft handoff when mobile station (A) is moving in a radio area of base station 1 currently in transmission can be solved.

In the conventional method of handoff operation, excessive transmission power may be received on a traffic channel on base station 2 which is about to start communication with mobile station (A) if the initial transmission is carried out with a fixed power value without considering the receiving condition of mobile station (A). This may cause declined received power in a forward traffic channel to produce a deteriorated error rate in a downlink communication. The present invention can solve the above-mentioned problem.

Also, the present invention can solve a conventional problem where mobile station (A) possibly fails to receive a soft handoff command with a short code for communicating with the handoff target base station 2.

The foregoing description of the embodiment is not intended to limit the invention to the particular examples. Any suitable modification may be resorted to the scope of the invention. All features and advantages of the invention which fall within the scope of the invention are covered by the appended claims.

What is claimed is:

1. A Code Division Multiple Access (CDMA) mobile communication system comprising:
    a plurality of mobile stations;
    a plurality of base stations, each including a transmitter for transmitting a common traffic channel to which each of the plurality of mobile stations can refer; and
    higher rank equipment for controlling and managing the plurality of base stations, including a table for managing the busy-idle state of each traffic channel in said plurality of base stations and a transmitter for transmitting information in said table to the plurality of mobile stations through the common traffic channel, wherein each of the plurality of mobile stations reports to said base station currently communicating at the time of soft handoff, information having, the received power of a pilot channel from the base station currently communicating, as well as the received power of a pilot channel from a target base station of soft handoff, and a short code of an idle traffic channel randomly selected using busy-idle information on traffic channels of said target base station obtained from the table information received through said common traffic channel of the target base station.

2. The CDMA mobile communication system according to claim 1, wherein said common traffic channel is transmitted using a common short code and a common long code.

3. A CDMA mobile communication system comprising:

a plurality of mobile stations;

a plurality of base stations; and higher rank equipment for controlling and managing said plurality of base stations, including, a table for managing the busy-idle information on traffic channels of base stations which surrounds a base station currently communicating with a mobile station; and a transmitter for transmitting the information content of said table to said mobile station through a traffic channel of said base station currently communicating each time said table is updated, wherein each of the plurality of mobile stations, at the time of soft handoff during which said mobile station is simultaneously communicating with a plurality of base stations, to said base station currently communicating, information having, the received power of a pilot channel from said base station currently communicating, as well as the received power of a pilot channel from a target base station of soft handoff, and a short code of an idle traffic channel randomly selected from idle traffic channels of said target base station by use of the corresponding busy-idle information extracted from the table information on traffic channels of the surrounding base stations received from said higher rank equipment.

4. A CDMA mobile communication system according to claim 1 or claim 3, wherein said higher rank equipment includes, a means for receiving said report information from the mobile station through the base station to examine using said table whether the short code specified in the received report is idle;

when said short code is idle, a means for directing the target base station of soft handoff to acquire a reverse traffic channel of said mobile station thereby to start the transmission of traffic data from said mobile station through the traffic channel specified by said short code;

a means for setting 'busy' state into said table corresponding to said short code; and a means for transmitting table information to said mobile station through the traffic channel of said base station currently communicating and through said common traffic channel of the target base station of soft handoff.

5. A CDMA mobile communication system comprising:

a mobile station;

a first base station and a second base station each having mutually neighboring coverage areas, at least either said first base station or said second base station including a code information transmitter for transmitting to said mobile station busy-idle code information obtained from said higher rank equipment; and higher rank equipment for managing said first base station and said second base station, including a table for managing the busy-idle state of codes allocated to a forward traffic channel of said second base station, wherein said mobile station includes;

an information reception means for receiving said busy-idle code information;

a selection means for selecting an idle code by use of the information content received by said information reception means;

a report means for reporting, at the time of handoff from said first base station to said second base station, a signal to said higher rank equipment to specify said selected code through either said first base station or said second base station, and a reception means for receiving a traffic channel from said second base station to said mobile station itself by use of the selected code, and said higher rank equipment further includes;

a control means for controlling said second base station to start transmission of a traffic channel to said mobile station by use of the specified code when said report is received.

6. A CDMA mobile communication system comprising a mobile station; a first base station and a second base station each having mutually neighboring coverage areas; and higher rank equipment for managing said first base station and said second base station, wherein said higher rank equipment includes:

a table for managing the busy-idle state of codes allocated to a forward traffic channel of said second base station;

a means for supplying the busy-idle code information to at least either said first base station or said second base station to enable to transmit to said mobile station;

a means for receiving from said mobile station through a base station a signal specifying a code selected from idle codes by use of said busy-idle code information, at the time of handoff from said first base station to said second base station; and a control means for controlling said second base station to start transmission of a traffic channel to said mobile station by use of the specified code when said indication signal is received.

7. A mobile station in a CDMA mobile communication system having a first base station and a second base station, each having mutually neighboring coverage areas, and higher rank equipment for managing said first base station and said second base station, said mobile station comprising:

an information reception means for receiving the busy-idle code information from at least either said first base station or said second base station, said code information supplied from a table maintained in said higher rank equipment for managing the busy-idle state of codes allocated to a forward channel of said second base station;

a selection means for selecting an idle code by use of the information content received by said information reception means;

a report means for reporting a signal to specify said selected code to said higher rank equipment through either said first base station or said second base station, at the time of handoff from said first base station to said second base station; and a reception means for receiving a traffic channel from said second base station to said mobile station itself by use of the selected code.

8. A CDMA mobile communication system comprising:

a mobile station;

a first base station and a second base station each having mutually neighboring coverage areas; and higher rank equipment for managing said first base station and said second base station, each base station including a code transmission means for transmitting to said mobile station the busy-idle information of codes allocated to a forward traffic channel of said second base station, obtained from a table maintained in said higher rank station for managing the busy-idle state of said codes.

* * * * *